US012462784B2

(12) United States Patent
Chen et al.

(10) Patent No.: US 12,462,784 B2
(45) **Date of Patent: *Nov. 4, 2025**

(54) AUDIO PROCESSING DEVICE

(71) Applicant: Airoha Technology Corp., Hsinchu (TW)

(72) Inventors: Kai-Sheng Chen, New Taipei (TW); En-Tai Kuo, Zhubei (TW); Dong-Jun Lin, Taipei (TW); Shih-Kai He, New Taipei (TW)

(73) Assignee: AIROHA TECHNOLOGY CORP., Hsinchu (TW)

( * ) Notice: Subject to any disclaimer, the term of this patent is extended or adjusted under 35 U.S.C. 154(b) by 1 day.

This patent is subject to a terminal disclaimer.

(21) Appl. No.: 17/856,245

(22) Filed: Jul. 1, 2022

(65) Prior Publication Data

US 2023/0186890 A1 Jun. 15, 2023

Related U.S. Application Data

(60) Provisional application No. 63/287,561, filed on Dec. 9, 2021.

(51) Int. Cl.
*G10K 11/178* (2006.01)
*H04R 1/10* (2006.01)

(52) U.S. Cl.
CPC .. *G10K 11/17854* (2018.01); *G10K 11/17819* (2018.01); *G10K 11/17823* (2018.01); *G10K 11/17825* (2018.01); *G10K 11/17881* (2018.01); *H04R 1/1083* (2013.01); *G10K 2210/1081* (2013.01); *G10K 2210/3026* (2013.01); *G10K 2210/3027* (2013.01); *G10K 2210/3028* (2013.01); *G10K 2210/3044* (2013.01); *H04R 2460/01* (2013.01)

(58) Field of Classification Search
CPC ..... G10K 2210/3026; G10K 11/17819; G10K 2210/506
See application file for complete search history.

(56) References Cited

U.S. PATENT DOCUMENTS 8,718,289 B2 5/2014 Shridhar et al.
9,202,456 B2 12/2015 Lee et al.
(Continued)

FOREIGN PATENT DOCUMENTS

CN 102473405 A 5/2012

OTHER PUBLICATIONS

TW Office Action dated Jun. 13, 2023 in Taiwan application No. 111133558.
(Continued)

*Primary Examiner* — Ping Lee
(74) *Attorney, Agent, or Firm* — McClure, Qualey & Rodack, LLP

(57) ABSTRACT

The disclosure provides an audio processing device comprising a first filter and a second filter. The first filter is configured to generate a first filtered signal based on an error signal, the error signal representative of audible sound at a target space. The second filter is configured to generate a second filtered signal based on the error signal. An anti-noise signal is generated based on the first filtered signal and the second filtered signal, and the anti-noise signal is included in the error signal. The first filter is connected to the second filter in parallel.

10 Claims, 11 Drawing Sheets

(56) References Cited

U.S. PATENT DOCUMENTS

| | | | | |
|---|---|---|---|---|
| 9,293,128 | B2 | 3/2016 | Goldstein | |
| 10,347,233 | B2 | 7/2019 | Park et al. | |
| 2006/0069556 | A1 * | 3/2006 | Nadjar | G10K 11/17881 704/229 |
| 2014/0086425 | A1 * | 3/2014 | Jensen | G10K 11/17825 381/71.11 |
| 2017/0125006 | A1 * | 5/2017 | Dzhigan | G10K 11/17881 |
| 2019/0266991 | A1 * | 8/2019 | Hayashi | H04R 1/1083 |
| 2020/0007984 | A1 * | 1/2020 | Rivera Benois | G10L 21/0232 |
| 2022/0293082 | A1 * | 9/2022 | Yamabe | G10K 11/17833 |

OTHER PUBLICATIONS

Meurers, T., et al.; Frequency Selective Feedback for Active Noise Control; IEEE Control Systems Magazine; Aug. 2002; pp. 32-41.

* cited by examiner

AUDIO PROCESSING DEVICE

This application claims the benefit of U.S. provisional application Ser. No. 63/287,561, filed Dec. 9, 2021, the subject matter of which is incorporated herein by reference.

TECHNICAL FIELD

The disclosure relates to an electronic device, and more particularly, relates to an audio processing device for noise reduction.

BACKGROUND

As progressing of technology related to wireless communication, headphone (i.e., earphone or headset) capable of communicating in a wireless manner has fulfilled the demand of mainstream market. During playing audio (e.g., phone call voice or music sound) to a user, the headphone provides a noise cancellation mechanism to suppress unwanted noise. The noise cancellation mechanism refers to, for example, an advanced noise cancellation (ANC). However, the existing noise cancellation techniques cannot effectively suppress unwanted noise. It is desirable to develop an audio processing device for reducing undesirable interference signals.

SUMMARY

According to one aspect of the disclosure, an audio processing device is provided. The audio processing device comprises a first filter and a second filter. The first filter is configured to generate a first filtered signal based on an error signal, the error signal representative of audible sound at a target space. The second filter is configured to generate a second filtered signal based on the error signal. Wherein an anti-noise signal is generated based on the first filtered signal and the second filtered signal, and the anti-noise signal is included in the error signal, and wherein the first filter is connected to the second filter in parallel.

Figure 1A:
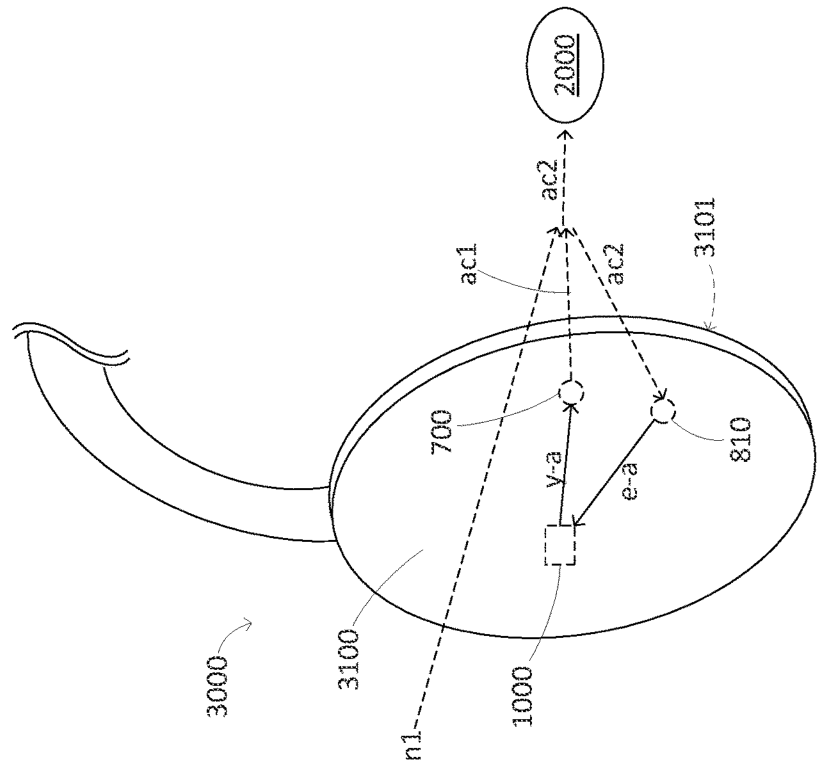
FIG. 1A is a schematic diagram illustrating an audio processing device applied to a headphone according to an example of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically illustrated in order to simplify the drawing.

DETAILED DESCRIPTION

In the noise cancellation mechanism, feedback (FB) units or feedforward (FF) units are employed. The FB and FF units take at least environmental noise as an error signal or a reference signal to achieve noise reduction. However, transfer function of circuits including the FB or FF units may have poles at certain frequencies, and such poles will lead to unstable status and cause a “howling” phenomena. Furthermore, over-shoot of the transfer function will lead to undesirably “added-on” of noise.

FIG. 1A is a schematic diagram illustrating an audio processing device 1000 applied to a headphone 3000 according to an example of the disclosure. Referring to FIG. 1A, the audio processing device 1000 is disposed in the headphone 3000 to provide an anti-noise signal to reduce influence caused by environmental noise. The headphone 3000 of FIG. 1A is, for example, an over-ear headphone or a head-mounted headset with an earmuff 3100 over an ear 2000 (e.g., the left-ear) of a user. The audio processing device 1000 refers to an integrated circuit (IC) disposed within at least one of a left-ear part and a right-ear part of the headphone 3000. For simplicity, FIG. 1A merely shows the left-ear part of the headphone 3000.

The earmuff 3100 of the headphone 3000 has an inner side 3101, and the inner side 3101 faces toward the ear 2000 when the earmuff 3100 covers the ear 2000. The headphone 3000 is equipped with a speaker 700 and a first microphone 810 both disposed on the inner side 3101 of the earmuff 3100. Hence, the first microphone 810 is an interior microphone of the headphone 3000, and serves as an error microphone. The audio processing device 1000 provides a cancelling signal y-a to the speaker 700, and the speaker 700 generates a first acoustic signal ac1 based on the cancelling signal y-a. The first acoustic signal ac1 serves as an anti-noise signal to reduce a first noise n1, which is an environmental noise. The environmental noise may be an external noise from environment outside the earmuff 3100, a noise appears between the earmuff 3100 and the ear 2000, an internal noise within a canal of the ear 2000, or a combination of the above all.

In operation, the first acoustic signal ac1 is adjusted based on the cancelling signal y-a, so that the first acoustic signal ac1 ideally has substantially equal amplitude and opposite phase with respect to the first noise n1. When the first acoustic signal ac1 is transmitted along a path from the speaker 700 toward the ear 2000, the first acoustic signal ac1 is superposed by the first noise n1 to form a second acoustic signal ac2. Since the first acoustic signal ac1 and the first noise n1 are substantially equal to each other in amplitude but opposite in phase, the first acoustic signal ac1 may significantly reduce or even entirely eliminate the first noise n1, and hence the resulted second acoustic signal ac2 may be approximately noise-free. The second acoustic signal ac2 is then heard by the ear 2000, and the user has a noise-free experience.

On the other hand, the first microphone 810 receives the second acoustic signal ac2 and generates an error signal e-a based on the second acoustic signal ac2. The error signal e-a is representative of audible sound at a target space, for example, ear 2000. When the first acoustic signal ac1 reduces the first noise n1 well, the error signal e-a almost reaches a zero-value in amplitude. Such an error signal e-a is then provided for the audio processing device 1000 to adjust the cancelling signal y-a (and may in turn adjust the first acoustic signal ac1).

Figure 1B:
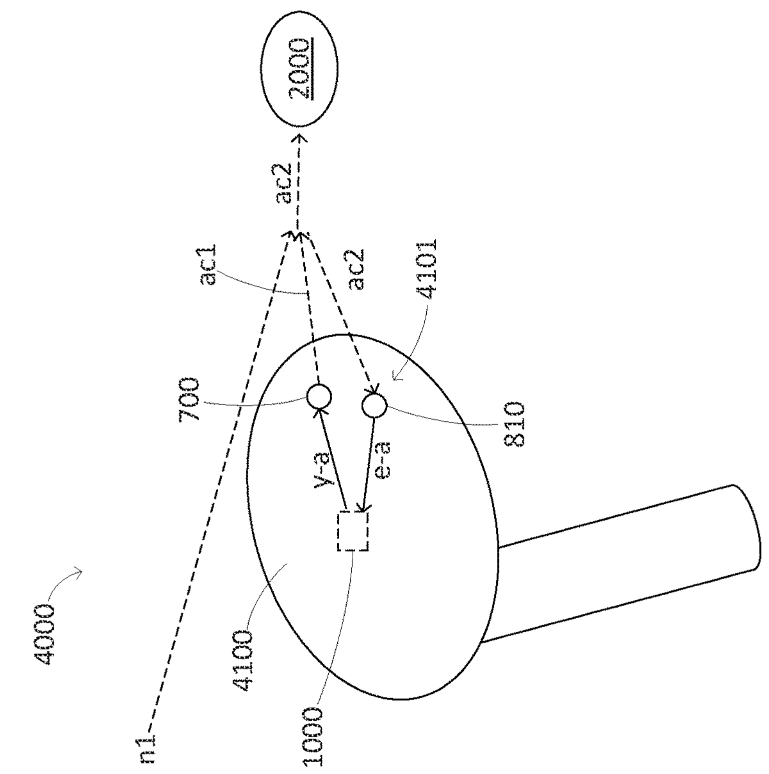
FIG. 1B is a schematic diagram illustrating an audio processing device applied to an earphone according to another example of the disclosure.

FIG. 1B is a schematic diagram illustrating an audio processing device 1000 applied to an headphone 4000 according to another example of the disclosure. As illustrated in FIG. 1B, the headphone 4000 is depicted as a set of wireless or wired in-ear earbuds (for simplicity, FIG. 1B merely shows a left-ear part of the headphone 4000). Similar to the example of FIG. 1A, the audio processing device 1000 also refers to an IC disposed within the headphone 4000. Furthermore, the headphone 4000 is also equipped with a speaker 700 and a first microphone 810. The headphone 4000 has a plug 4100, and the plug 4100 has an inner portion 4101 to be fitted into the ear 2000. The speaker 700 and the first microphone 810 are disposed on the inner portion 4101 of the plug 4100. The audio processing device 1000 provides the cancelling signal y-a to control amplitude and phase of the first acoustic signal ac1 so as to reduce the first noise n1. Moreover, the second acoustic signal ac2, formed by superposing the first acoustic signal ac1 on the first noise n1, is employed by the first microphone 810 to generate the error signal e-a.

Figure 2:
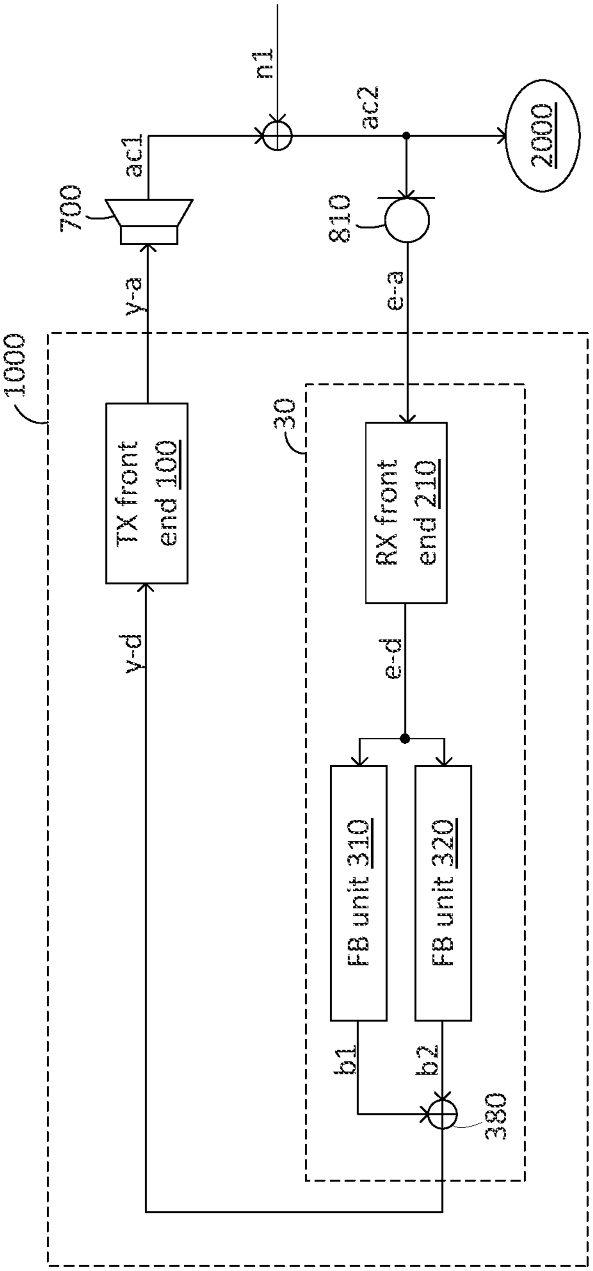
FIG. 2 is a block diagram of the audio processing device in FIGS. 1A and 1B.

FIG. 2 is a block diagram of the audio processing device 1000 in FIGS. 1A and 1B. Referring to FIG. 2, the audio processing device 1000 includes a transmitting (TX) front end 100, a receiving (RX) front end 210 and a plurality of feedback (FB) units. In the example of FIG. 2, the audio processing device 1000 includes two FB units (i.e., FB units 310 and 320) coupled in shunt. That is, the FB units 310 and 320 are coupled to each other in parallel. Furthermore, the RX front end 210 is coupled to the FB units 310 and 320 to form a FB path 30. In an embodiment, the FB units 310 and 320 are implemented by execute instructions stored on a memory, using a processor.

The RX front end 210 is electrically or communicatively coupled to the first microphone 810 to receive the error signal e-a. The error signal e-a is an analog signal, and the RX front end 210 is an analog circuitry part of the audio processing device 1000. The RX front end 210 serves to process the analog error signal e-a to obtain an error signal e-d in digital domain. In one example, the RX front end 210 includes at least a pre-amplifier, an anti-aliasing filter and an analog-to-digital converter (ADC) (not shown in FIG. 2) which function to amplify the error signal e-a, remove unwanted harmonics thereof and convert the error signal e-a to the error signal e-d in digital domain. Then, the resulted digital error signal e-d is provided to the FB units 310 and 320 to generate FB signals b1 and b2. Furthermore, the FB path 30 further includes a mixer 380 functioning to combine the FB signals b1 and b2 to form a cancelling signal y-d.

The error signal e-d serves an "indicator" for evaluating performance of the audio processing device 1000. When the first acoustic signal ac1 well reduces or even eliminate the first noise n1, the error signal e-d is almost zero in amplitude. Each of the FB units 310 and 320 includes filters (not shown in FIG. 2), and the error signal e-d is used to generate input sequence for the filters in the FB units 310 and 320. Furthermore, the error signal e-d is used to adjust coefficients of the filter in each of the FB units 310 and 320, so that the FB units 310 and 320 can provide desired FB signals b1 and b2, respectively. A desired cancelling signal y-d is obtained based on the FB signals b1 and b2. Subsequently, the cancelling signal y-d is processed by the TX front end 100 to obtain the cancelling signal y-a. Similar to the RX front end 210, the TX front end 100 is another analog circuitry part of the audio processing device 1000, which may include a digital-to-analog converter (DAC), a reconstruction filter and a power amplifier (not shown in FIG. 2). The TX front end 100 functions to convert the cancelling signal y-d in digital domain into the cancelling signal y-a in analog domain. Then, the speaker 700 generates the first acoustic signal ac1 based on the cancelling signal y-a.

Figure 3A:
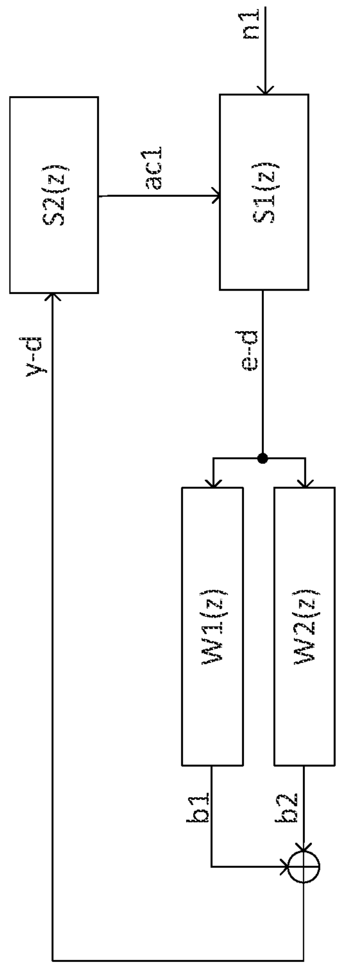
FIGS. 3A and 3B are equivalent sampled-time block diagrams illustrating equivalent transfer function of the audio processing device of FIG. 2.
Figure 3B:
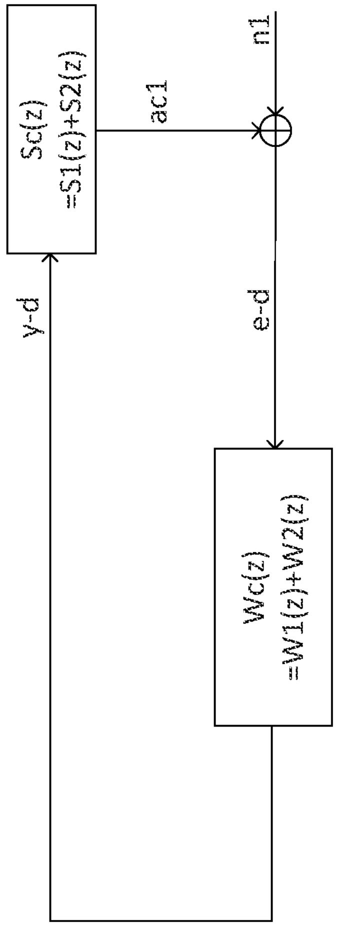

FIGS. 3A and 3B are equivalent sampled-time block diagrams illustrating equivalent transfer function of the audio processing device 1000 of FIG. 2. Referring to FIGS. 3A and 3B, the FB unit 310 has an impulse response $w1(n)$ representing characteristics of processing behavior performed by the FB unit 310. The impulse response $w1(n)$ may be transformed to Z-domain as a transfer function $W1(z)$ as depicted in FIGS. 3A and 3B to evaluate the FB unit 310. Likewise, another FB unit 320 has an impulse response $w2(n)$ representing its behavior, and the FB unit 320 has a corresponding a transfer function $W2(z)$ as depicted in FIGS. 3A and 3B in Z-domain. The overall behavior of the FB units 310 and 320 is evaluated by an equivalent transfer function Wc(z) as expressed in equation (1):

$$Wc(z)=W1(z)+W2(z) \quad \text{eq. (1)}$$

Furthermore, the path from the first microphone 810 to the FB units 310 and 320 through the RX front end 210 is evaluated by an equivalent transfer function $S1(z)$, and the path from the FB units 310 and 320 to the speaker 700 through the TX front end 100 is evaluated by an equivalent transfer function $S2(z)$. The overall path, which starts from output of FB units 310 and 320 and ends at input of FB units 310 and 320, is evaluated by an equivalent transfer function Sc(z) shown as equation (2):

$$Sc(z)=S1(z)+S2(z) \quad \text{eq. (2)}$$

From the above, an overall transfer function H(z) of the audio processing device 1000 is obtained as equation (3):

$$H(z)=\frac{1}{1+Sc(z)Wc(z)}=\frac{1}{1+Sc(z)[W1(z)+W2(z)]} \quad \text{eq. (3)}$$

In addition, an overall gain Gv of the audio processing device 1000 may be derived from the transfer function H(z). If the portion "Sc(z)[W1(z)+W2(z)]" of denominator of the transfer function H(z) has a value equal to minus one (i.e., $Sc(z)[W1(z)+W2(z)]=-1$) at a frequency F0, the denominator of transfer function H(z) becomes zero (i.e., $1+Sc(z)[W1(z)+W2(z)]=0$) and the transfer function H(z) has a "pole" at frequency F0, which leads the audio processing device 1000 to an unstable status. At such a frequency F0, the audio processing device 1000 has infinite overall gain Gv so that the first noise n1 is infinitely amplified and a "howling" phenomena is caused. To alleviate such a "howling", two or more FB units 310, 320, etc., are disposed in the audio processing device 1000. The more the number of FB units 310, 320, etc. are employed, the better prevention for "howling" are achieved.

On the other hand, if the transfer function H(z) has a magnitude greater than one (i.e., $|H(z)|>1$) at some other frequencies (or in some frequency range), the first noise n1 is also undesirably amplified by the audio processing unit 1000. In this case, "over-shoot" of the transfer function H(z) may be observed in spectrum analysis, indicating that first noise n1 is undesirably "added-on". For the audio processing device 1000 of the disclosure, disposing more number of FB units 310, 320, etc. may also help to alleviate such "noise add-on".

In further detail, generally, for a noise cancellation device, it is desired to have relatively broad bandwidth. However, an unwanted add-on phenomena and an unwanted howling phenomena are likely to occur as the bandwidth is increased. The bandwidth cannot be increased indefinitely in consideration of at least the add-on and howling phenomena.

Some existing approaches uses a single FB unit. The equivalent transfer function Sc(z) is dominated by the single FB unit. A tuning dimension is accordingly only one and determined by the single FB unit. The bandwidth is relatively narrow about 300 Hz in a given magnitude of about 10 dB on the premise that the add-on and howling phenomena are prevented to occur.

In the present disclosure, at least two FB units are used. The equivalent transfer function Sc(z) is dominated by the at least two FB units. A tuning dimension is accordingly at least two, more than the existing approaches. As a result, the bandwidth is relatively broad about 800 Hz in a given magnitude of about 10 dB on the premise that the add-on and howling phenomena are prevented to occur.

Figure 4:
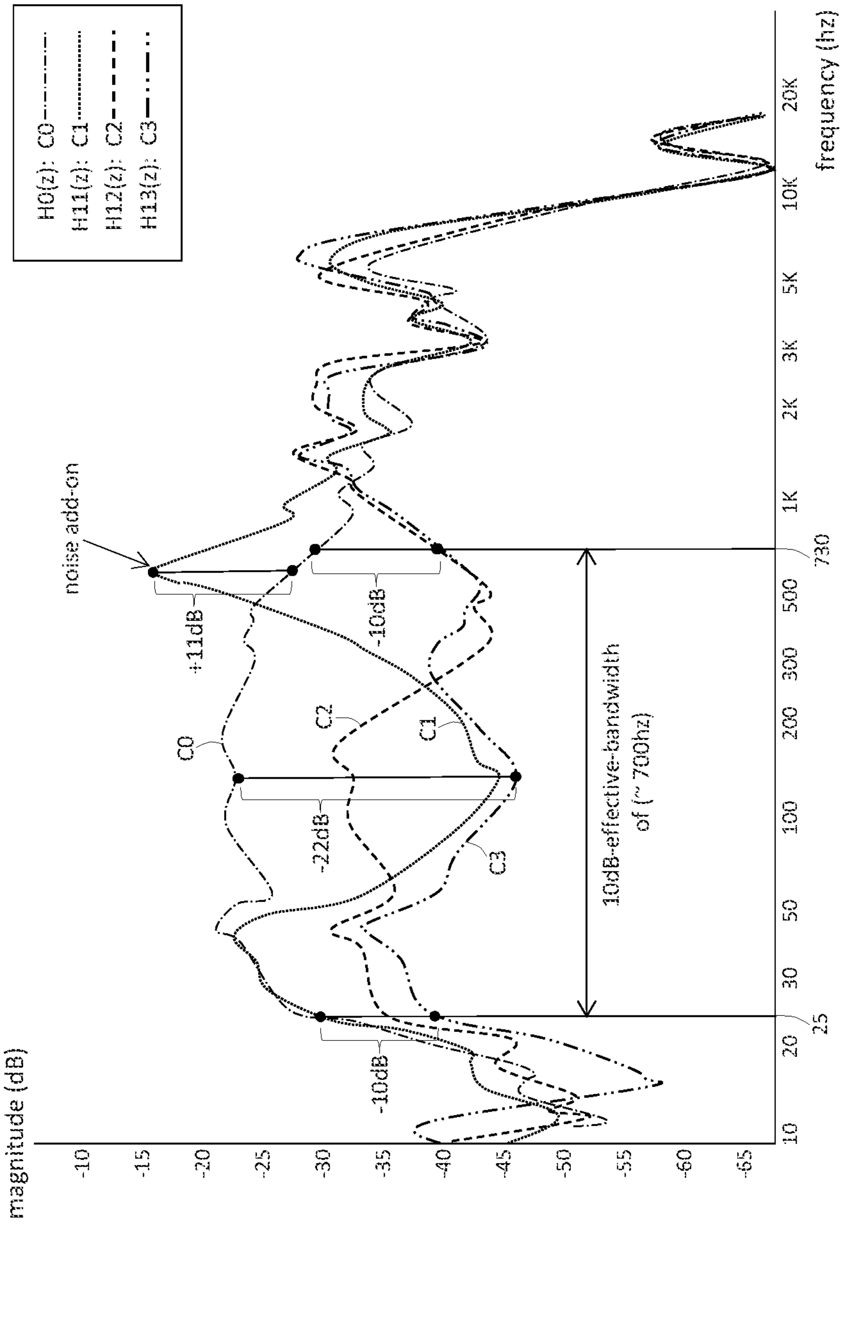
FIG. 4 is a spectrum diagram illustrating spectrum analysis for transfer functions of various examples of audio processing devices of the disclosure.

FIG. 4 is a spectrum diagram illustrating spectrum analysis for transfer functions H(z) of various examples of audio processing devices of the disclosure. FIGS. 5A to 5E are block diagrams illustrating transfer functions of various examples of audio processing devices, according to the spectrum diagram of FIG. 4. Firstly, referring to FIGS. 4 and 5A, when the audio processing device 1000 is not equipped with any FB units, transfer function H(z) of the audio processing device 1000 may be obtained as equation (4):

$$H(z) = H0(z) = \frac{1}{1 + Sc(z)} \quad \text{eq. (4)}$$

Regarding curve C0 of FIG. 4, curve C0 corresponds to spectrum of H0($z$) and represents magnitude of the second acoustic signal ac2 of FIG. 2.

Figure 5A:
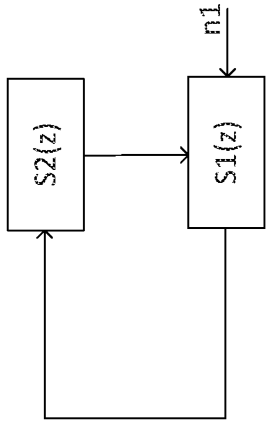
FIGS. 5A to 5E are block diagrams illustrating transfer functions of various examples of audio processing devices, according to the spectrum diagram of FIG. 4.
Figure 5B:
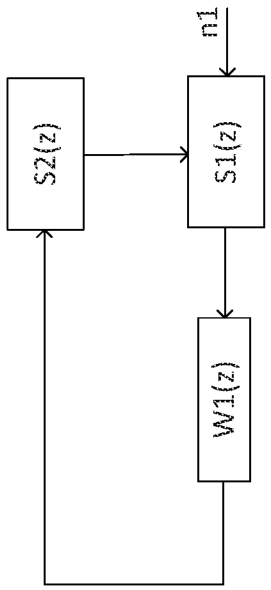

Next, referring to FIGS. 4 and 5B, when the audio processing device 1000 is equipped with one FB unit, (e.g., only the FB unit 310), transfer function H(z) of the audio processing device 1000 is expressed as equation (5):

$$H(z) = H11(z) = \frac{1}{1 + Sc(z)W1(z)} \quad \text{eq. (5)}$$

Curve C1 of FIG. 4 corresponds to spectrum of H11($z$), in which curve C1 represents magnitude of the second acoustic signal ac2. Regarding curve C1, at frequency of about 150 Hz the second acoustic signal ac2 has a magnitude drop of 22 dB relative to curve C0, indicating the first noise n1 is significantly reduced. However, at frequency about 680 Hz, the second acoustic signal ac2 has an unwanted magnitude gain of 11 dB relative to curve C0, indicating "noise add-on" occurs at 680 Hz.

Figure 5C:
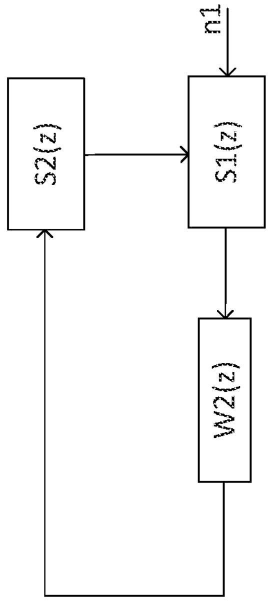

Next, referring to FIGS. 4 and 5C, when the audio processing device 1000 is equipped with another single FB unit, (e.g., only the FB unit 320), transfer function H(z) of the audio processing device 1000 is obtained as equation (6). Regarding curve C2 which corresponds to spectrum of H12($z$), "noise add-on" does not occur, for example, from 25 Hz to 680 Hz, in curve C2.

$$H(z) = H12(z) = \frac{1}{1 + Sc(z)W2(z)} \quad \text{eq. (6)}$$

Figure 5D:
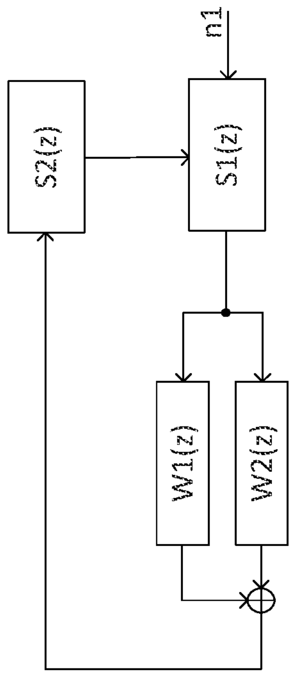

Next, referring to FIGS. 4 and 5D, when the audio processing device 1000 is equipped with two FB units 310 and 320 coupled in shut (in accordance with the example of FIG. 2), transfer function H(z) of the audio processing device 1000 is obtained as equation (7):

$$H(z) = H2(z) = \frac{1}{1 + Sc(z)[W1(z) + W2(z)]} \quad \text{eq. (7)}$$

Regarding curve C3 which corresponds to the spectrum of H13($z$), "noise add-on" does not occur, for example, from 25 Hz to 730 Hz. Furthermore, greater magnitude drop is observed in curve C3, (e.g., a drop greater than 22 db appears at 150 Hz, and greater than the embodiment of FIG. 5C). The above spectrum analysis shows that, given the FB units (e.g., FB units 310 and 320) are coupled in shunt, if the number of FB units increases, better noise reduction will be achieved. Moreover, comparing to curve C0, magnitude drop of at least 10 dB occurs from about 25 Hz to about 730 Hz in curve C3, and hence spectrum of H13($z$) has "10 db-BW" (i.e., 10 dB-effective-bandwidth) of approximately 700 Hz. Which means, as the number of parallel-coupled FB units increases, greater bandwidth can be also achieved on the premise that the add-on and howling phenomena are prevented to occur.

Figure 5E:
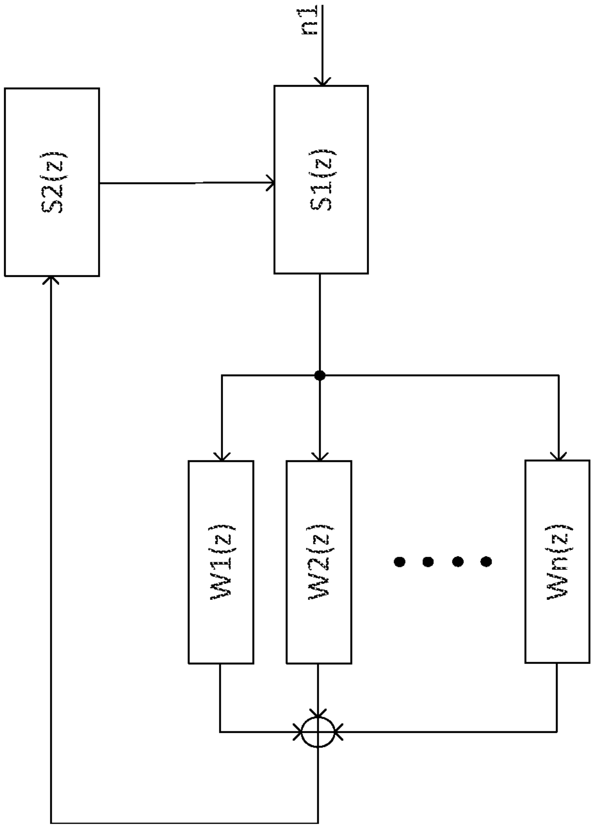

Next, referring to FIG. 5E, when the audio processing device 1000 is equipped with more FB units (e.g., n's FB units) coupled in shunt, transfer function H(z) of the audio processing device 1000 is expressed as equation (8):

$$H(z) = Hn(z) = \frac{1}{1 + Sn(z)[W1(z) + W2(z) + W3(z) + \ldots + Wn(z)]} \quad \text{eq. (8)}$$

Though spectrum of Hn(z) is not shown in FIG. 4, theoretical studies and experimental simulations indicate that spectrum of Hn(z) can achieve much greater magnitude drop with respect to C0 and much wider 10 dB-BW. That is, the more the number of parallel-coupled FB units disposed in the audio processing device 1000, the greater magnitude drop (i.e., better noise reduction) and the wider 10 dB-BW (i.e., better "howling" prevention) can be achieved.

Figure 6B:
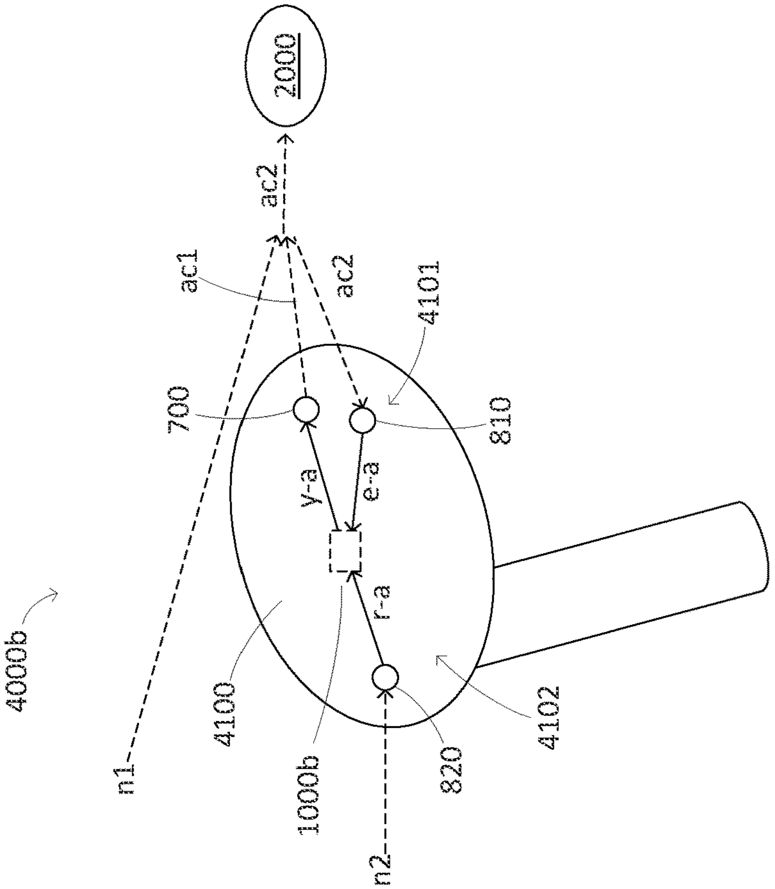
FIG. 6B is a schematic diagram illustrating an audio processing device applied to an earphone according to still another example of the disclosure.
Figure 6A:
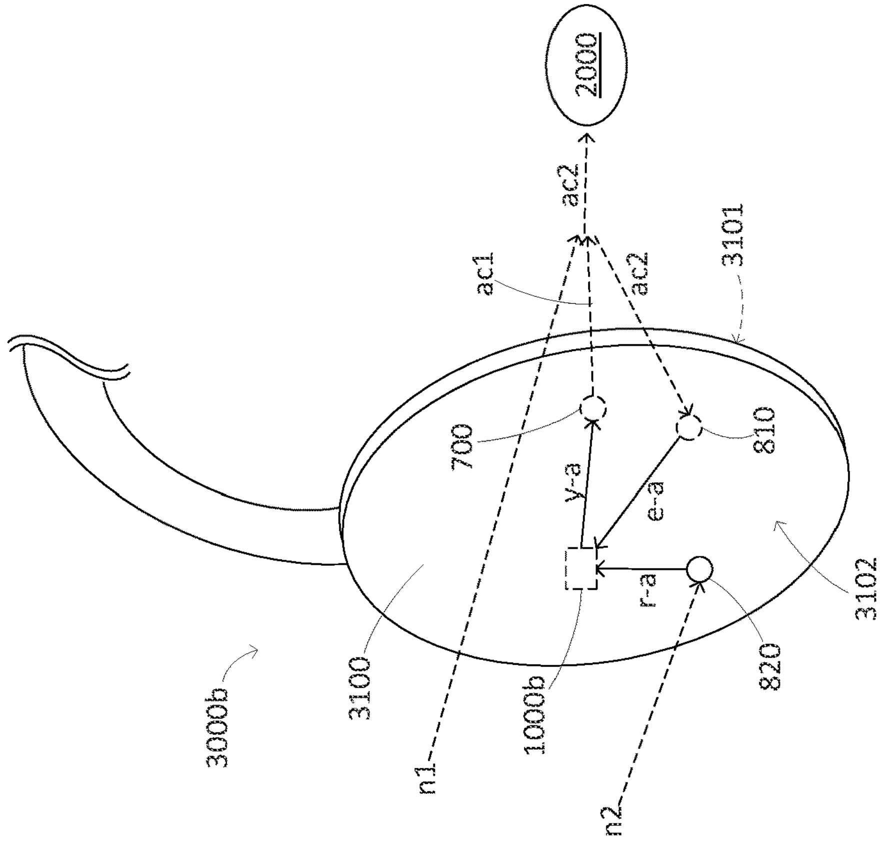
FIG. 6A is a schematic diagram illustrating an audio processing device applied to a headphone according to another example of the disclosure.

FIG. 6A is a schematic diagram illustrating an audio processing device 1000*b* applied to a headphone 3000*b* according to another example of the disclosure. FIG. 6B is a schematic diagram illustrating an audio processing device 1000*b* applied to a headphone 4000*b* according to still another example of the disclosure.

Referring to FIG. 6A, the headphone 3000*b* is similar to the headphone 3000 of FIG. 1A except that, the headphone 3000*b* is further equipped with a second microphone 820 to receive a second noise n2. The earmuff 3100 of the headphone 3000*b* has an outer side 3102, and the outer side 3102 faces opposite to the ear 2000 when the earmuff 3100 covers the ear 2000. The second microphone 820 is disposed on the outer side 3102 of the earmuff 3100. Hence, the second microphone 820 is an exterior microphone of the headphone 3000*b*.

Referring to FIG. 6B, the headphone 4000*b* is similar to the headphone 4000 of FIG. 1B except that, the headphone 4000*b* is further equipped with a second microphone 820 to receive a second noise n2. The plug 4100 of the headphone 4000*b* has an outer portion 4102, which is exposed from the ear 2000 when the inner portion 4101 is inserted into the ear 2000. The second microphone 820 is disposed on the outer portion 4102 of the plug 4100.

The second noise n2 is another environmental noise, and the second microphone 820 generates a reference signal r-a based on the second noise n2. In operation, the first microphone 810 serves as an "error microphone" to provide the error signal e-a, while the second microphone 820 serves as a "reference microphone" to provide the reference signal r-a. The error signal e-a is provided to the audio processing device 1000*b* through a FB path, while the reference signal r-a is provided to the audio processing device 1000*b* through a feedforward (FF) path. The error signal e-a and the reference signal r-a are utilized by the audio processing device 1000*b* to generate the desired cancelling signal y-a, so that the speaker 700 is able to provide desired first acoustic signal ac1 based on the cancelling signal y-a.

Figure 7A:
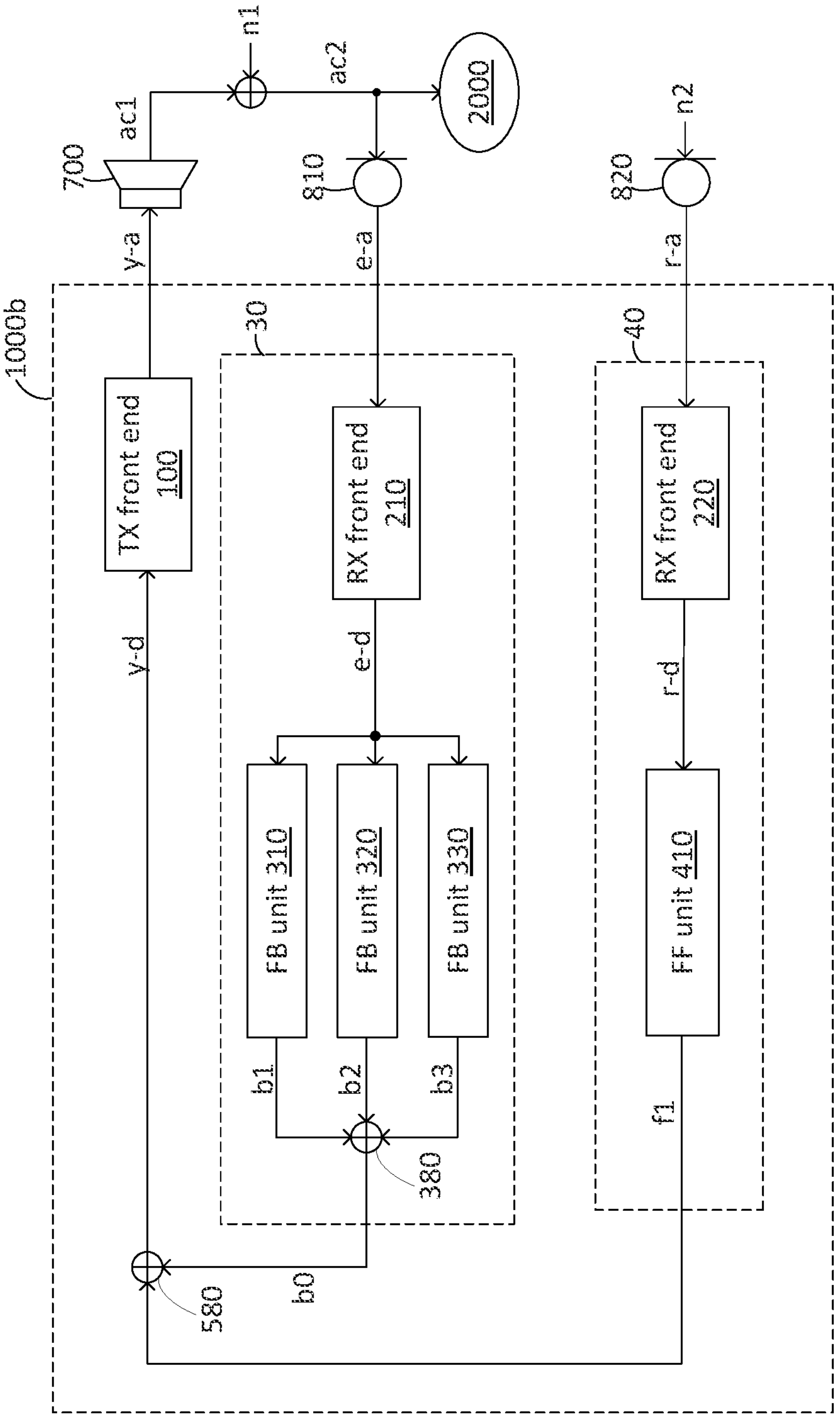
FIG. 7A is a block diagram of the audio processing device in FIGS. 6A and 6B.

FIG. 7A is a block diagram of the audio processing device 1000*b* in FIGS. 6A and 6B. Referring to FIG. 7A, the audio processing device 1000*b* is similar to the audio processing device 1000 of FIG. 2 except that, the audio processing device 1000*b* further includes a RX front end 220 and a feedforward (FF) unit 410, and the FB path 30 further includes a FB unit 330 (i.e., a third FB unit). In an embodiment, the FF unit 410 and the FB units 310, 320 and 330 are implemented by execute instructions stored on a memory, using a processor. In the following content, the RX front end 210 can be called "a first RX front end", and the RX front end 220 can be called "a second RX front end" when appropriate. The RX front end 220 is coupled to the FF unit 410 to form the FF path 40, and the FF path 40 is disposed in a substantially parallel manner with the FB path 30. Furthermore, the FB units 310, 320 and 330 are coupled to one another in a parallel manner (i.e., coupled in shunt). That is, the audio processing device 1000*b* has a "hybrid type" of circuit configuration including both FB path 30 and FF path 40. In the "hybrid type" of circuit configuration, the FB units 310, 320 and 330 in the FB path 30 function to process the error signal e-d derived from the first microphone 810, while the FF unit 410 in the FF path 40 functions to process a reference signal r-d derived from the second microphone 820.

More particularly, the second microphone 820 (i.e., the "reference microphone") generates a reference signal r-a based on the second noise n2 where the reference signal r-a is of analog type. Then, the RX front end 220 in the FF path 40 converts the reference signal r-a in analog domain into the reference signal r-d in digital domain. The FF unit 410 includes filters (not shown in FIG. 7A), and the reference signal r-d is used to generate input sequence for the filters in the FF unit 410. Furthermore, the reference signal r-d is used to adjust coefficients of the filters in the FF unit 410, so that FF unit 410 provides desired FF signal f1.

The FB signals b1, b2 and b3 from the FB units 310 to 330 are combined, by the mixer 380, to form an overall FB signal b0. The audio processing device 1000*b* further includes a mixer 580, and the overall FB signal b0 is combined with the FF signal f1 by the mixer 580 to form the cancelling signal y-d. Moreover, the cancelling signal y-d in digital domain is converted, by the TX front end 100, into the cancelling signal y-a in analog domain. That is, with the "hybrid type" of circuit configuration including both the FB path 30 and the FF path 40, the cancelling signal y-a is derived based on the error signal e-a and the reference signal r-a through the FB path 30 and FF path 40, respectively. Thereafter, the cancelling signal y-a is provided to the speaker 700 to generate the first acoustic signal ac1, and the first acoustic signal ac1 is used to eliminate the first noise n1.

Figure 7B:
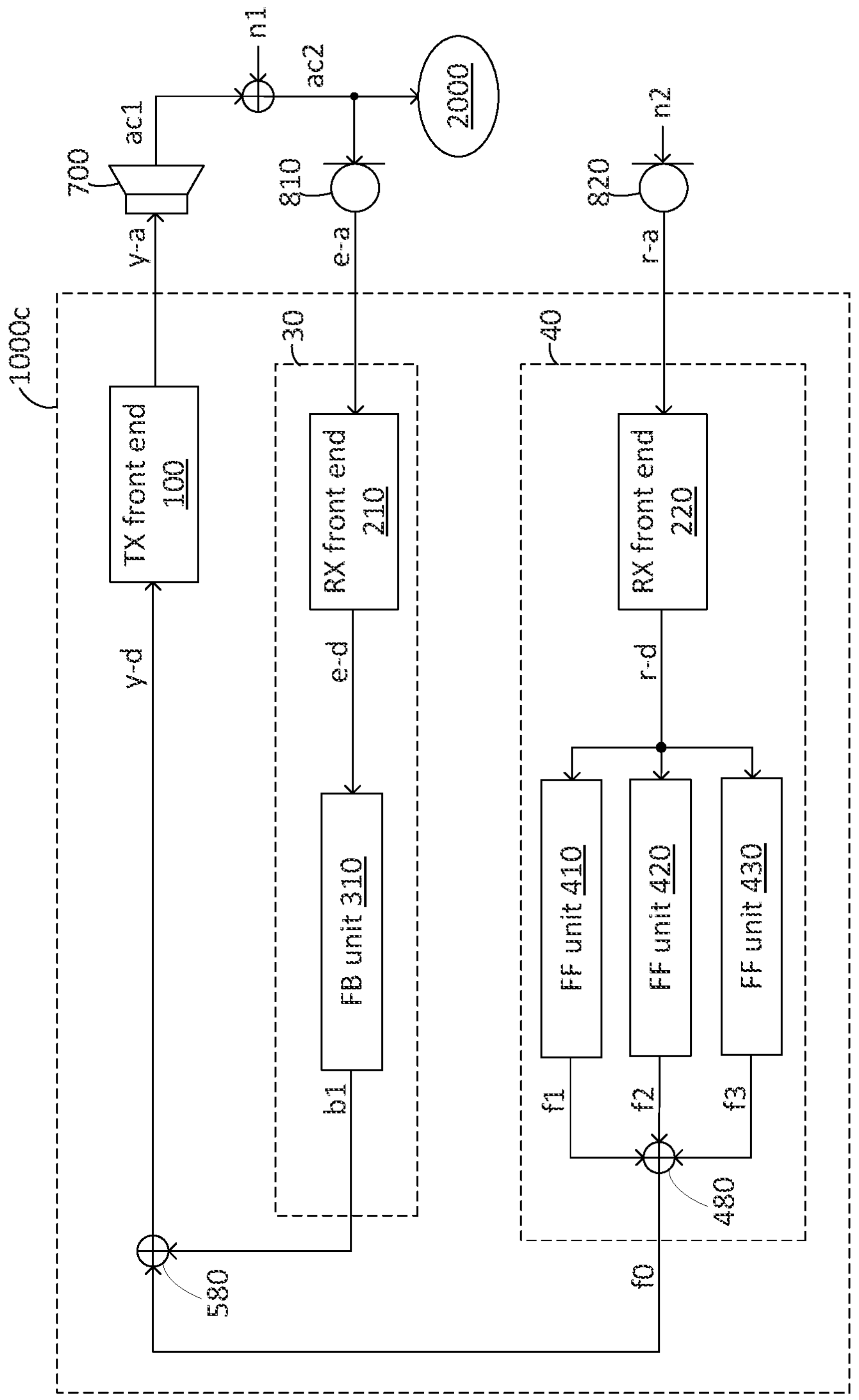
FIG. 7B is a block diagram of yet another example of audio processing device of the disclosure.

FIG. 7B is a block diagram of yet another example of audio processing device 1000*c* of the disclosure. Referring to FIG. 7B, the audio processing device 1000*c* also has a "hybrid type" of circuit configuration including both FB path 30 and FF path 40. The audio processing device 1000*c* of FIG. 7B is similar to the audio processing device 1000*b* of FIG. 7A except that, the audio processing device 1000*c* includes a plurality of FF units, FF units 410,420 and 430. The FF units 410, 420 and 430 are coupled in shunt; that is, the FF units 410 to 430 are coupled to one another in parallel. In an embodiment, the FF units 410, 420 and 430 and the FB unit 310 are implemented by execute instructions stored on a memory, using a processor. The audio processing device 1000*c* further includes a mixer 480 disposed in the FF path 40, and FF signals f1, f2 and f3 from the FF units 410, 420 and 430 are combined by the mixer 480 to obtain an overall FF signal f0.

Furthermore, compared with the audio processing device 1000*b* of FIG. 7A, the audio processing device 1000*c* of FIG. 7B includes a few number of FB unit, e.g., only one FB unit 310. The FB signal b1 from the FB unit 310 is combined with the overall FF signal f0, by the mixer 580, to form the cancelling signal y-d, and the cancelling signal y-d is converted by the TX front end 100 into form the cancelling signal y-a.

Figure 7C:
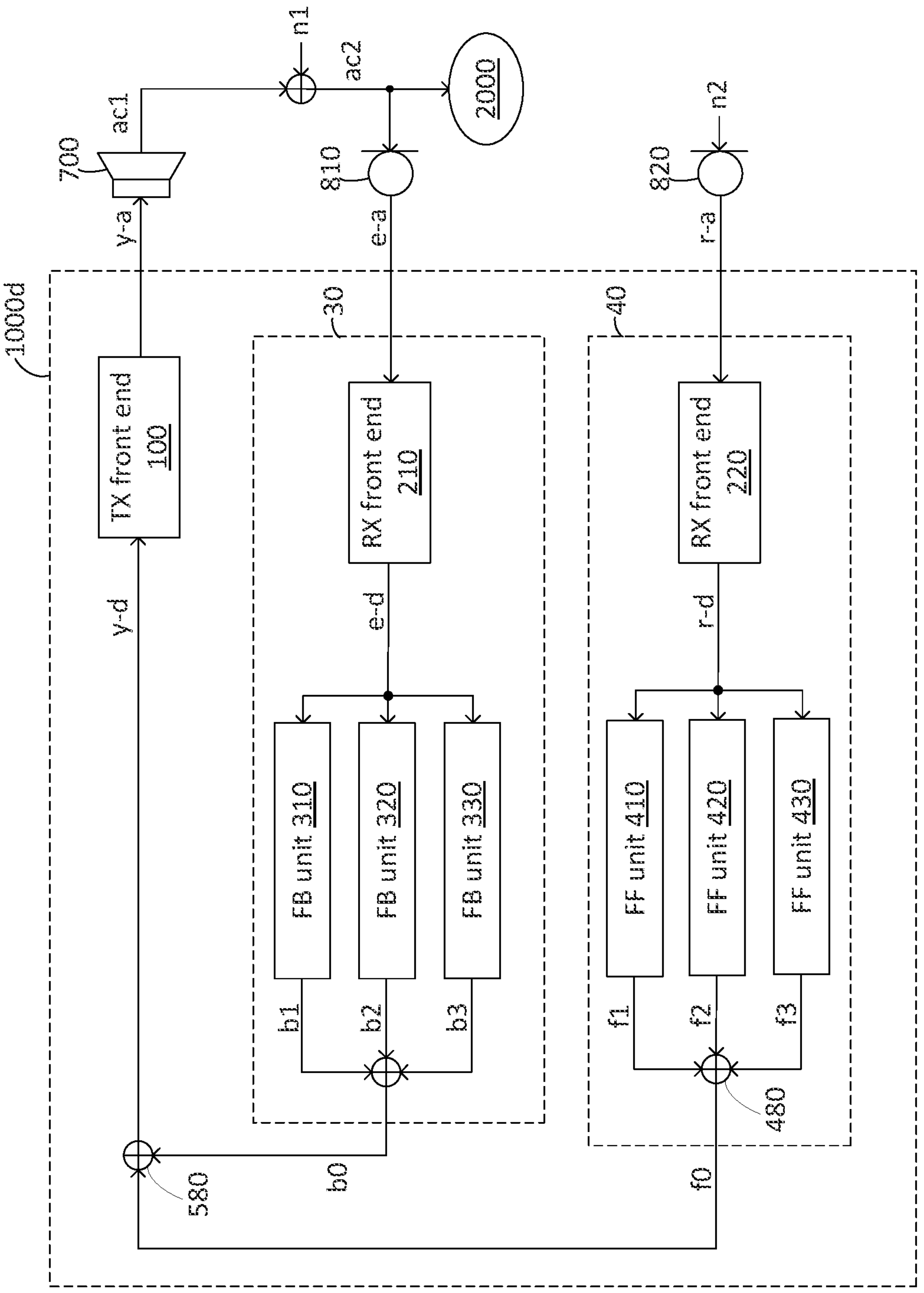
FIG. 7C is a block diagram of further another example of audio processing device of the disclosure.

FIG. 7C is a block diagram of further another example of audio processing device 1000*d* of the disclosure. Referring to FIG. 7C, the audio processing device 1000*d* is similar to the audio processing device 1000*c* of FIG. 7B except that, the FB path 30 of the audio processing device 1000*d* includes a plurality of FB units, FB units 310, 320 and 330. In an embodiment, the FF units 410, 420 and 430 and the FB units 310, 320 and 330 are implemented by execute instructions stored on a memory, using a processor. The FB signals b1, b2 and b3 are combined to form an overall FB signal b0. Then, the overall FB signal b0 provided by the FB path 30 and the overall FF signal f0 provided by the FF path 40 are combined to form the cancelling signal y-d.

Figure 8:
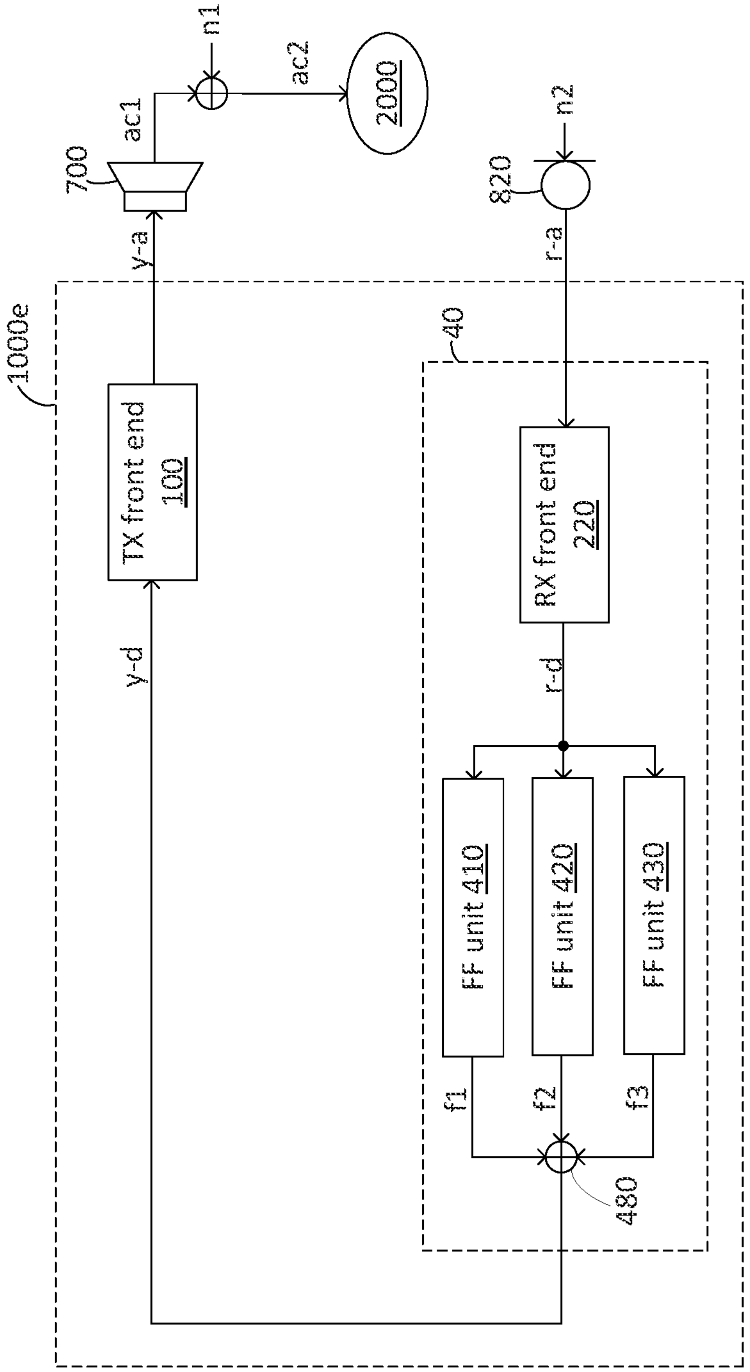
FIG. 8 is a block diagram of further another example of audio processing device of the disclosure.

FIG. 8 is a block diagram of further another example of audio processing device 1000*e* of the disclosure. Referring to FIG. 8, the audio processing device 1000*e* is similar to the audio processing device 1000*c* of FIG. 7B except that, the audio processing device 1000*e* includes only the FF path 40, but does not include any FB path. That is, circuit configuration of the audio processing device 1000*e* is not "hybrid type". For the audio processing device 1000*e*, the FF signals f1, f2 and f3 from the FF units 410, 420 and 430 are combined to form the cancelling signal y-d.

According to the aforementioned examples of audio processing devices of the disclosure, a plurality of FB units is disposed in the FB path 30, where the FB units are coupled to one another in a parallel manner (i.e., coupled in shunt).

With the shunt-coupled configuration of FB units, poles and overshoot of the equivalent transfer function of the audio processing device are remedied, hence howling phenomenon and noise added-on can be eliminated, and signal bandwidth can be increased. Furthermore, audio processing devices of the disclosure alternatively have a hybrid type of configuration including both FB path 30 and FF path 40, where the FF path 40 receives the reference signal r-a based on the second noise n2 (i.e., the another environmental noise). With further aids of the reference signal r-a, more desirable cancelling signal y-a can be obtained, and the corresponding first acoustic signal ac1 will better reduce the first noise n1.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An audio processing device, comprising:

a first active noise cancellation (ANC) filter, configured to generate a first anti-noise signal by applying only a time domain filtering to a full band of an error signal during an ANC period, the error signal is representative of audible sound at a target space; and a second ANC filter, configured to generate a second anti-noise signal by applying only the time domain filtering to the full band of the error signal during the ANC period, wherein the first and second anti-noise signals are each simultaneously converted into an acoustic anti-noise signal to cancel environmental noise, or the first and second anti-noise signals in combination are converted into the acoustic anti-noise signal to cancel environmental noise, wherein the acoustic anti-noise signal is included in the error signal, and wherein the first ANC filter is connected to the second ANC filter in parallel, wherein the first ANC filter and the second ANC filter are independent of each other, and wherein the ANC period excludes a transition period in which both the first ANC filter and the second ANC filter temporarily generate the first anti-noise signal and the second anti-noise signal prior to only one of the first ANC filter and the second ANC filter generating the corresponding one of the first anti-noise signal and the second anti-noise signal.

2. The audio processing device according to claim 1, further comprising:

a receiving (RX) front end, configured to convert the error signal from an analog domain to a digital domain.

3. The audio processing device according to claim 2, further comprising:

a mixer, configured to generate a cancelling signal associated with the acoustic anti-noise signal by combining the first anti-noise signal with the second anti-noise signal.

4. The audio processing device according to claim 3, further comprising:

a transmitting (TX) front end, configured to convert the cancelling signal from a digital domain to an analog domain.

5. The audio processing device according to claim 4, wherein the first ANC filter and the second ANC filter are coupled to the RX front end, and the first ANC filter, the second ANC filter and the RX front end define a feedback (FB) path, wherein the FB path provides the cancelling signal to the TX front end.

6. The audio processing device according to claim 1, wherein each of the first ANC filter and the second ANC filter is a feedback (FB) filter, or each of the first ANC filter and the second ANC filter is a feedforward (FF) filter.

7. The audio processing device according to claim 1, wherein the first ANC filter is one of a feedback (FB) filter and a feedforward (FF) filter, and the second ANC filter is the one of a FB filter and a FF filter, the audio processing device further comprising:

a third ANC filter, being the other of a FB filter and a FF filter.

8. The audio processing device according to claim 1, wherein each of the first ANC filter and the second ANC filter is a feedback (FB) filter, the audio processing device further comprising:

a third ANC filter, being a feedforward (FF) filter, configured to generate a third anti-noise signal based on a reference signal from an exterior microphone of a headphone; and a fourth ANC filter, being a FF filter, configured to generate a fourth anti-noise signal based on the reference signal, wherein the third ANC filter is connected to the fourth ANC filter in parallel.

9. The audio processing device according to claim 8, further comprising:

a receiving (RX) front end, configured to convert the error signal from an analog domain to a digital domain;

a first mixer, configured to generate an overall FB signal by combining the first anti-noise signal and the second anti-noise signal; and a second mixer, configured to generate an overall FF signal by combining the third anti-noise signal and the fourth anti-noise signal.

10. The audio processing device according to claim 9, further comprising:

a third mixer, configured to generate a cancelling signal associated with the acoustic anti-noise signal by combining the overall FB signal and the overall FF signal; and a transmitting (TX) front end, configured to convert the cancelling signal from the digital domain to the analog domain.

* * * * *